United States Patent
Tiffany, III et al.

(10) Patent No.: US 10,464,742 B2
(45) Date of Patent: Nov. 5, 2019

(54) AERATOR VALVE ASSEMBLY

(71) Applicant: Control Concepts, Putnam, CT (US)

(72) Inventors: Henry D. Tiffany, III, Juneau, AK (US); Paul S. Rose, Sanibel, FL (US); Aaron G. Hall, North Grosvenordale, CT (US); Daniel S. Smith, Woodstock, CT (US)

(73) Assignee: Control Concepts, Inc., Putnam, CT (US)

( * ) Notice: Subject to any disclaimer, the term of this patent is extended or adjusted under 35 U.S.C. 154(b) by 0 days.

(21) Appl. No.: 15/979,334

(22) Filed: May 14, 2018

(65) Prior Publication Data

US 2018/0339849 A1  Nov. 29, 2018

Related U.S. Application Data

(63) Continuation-in-part of application No. 15/603,329, filed on May 23, 2017.

(51) Int. Cl.
*F16K 15/06* (2006.01)
*B65D 88/70* (2006.01)
(Continued)

(52) U.S. Cl.
CPC ......... *B65D 88/706* (2013.01); *B65D 88/703* (2013.01); *F16K 15/06* (2013.01);
(Continued)

(58) Field of Classification Search
CPC ............. F16K 17/0493; F16K 37/0041; F16K 37/005; F16K 15/063
(Continued)

(56) References Cited

U.S. PATENT DOCUMENTS 3,550,625 A   12/1970   Adams, Jr.
3,788,527 A   1/1974   Matson
(Continued)

OTHER PUBLICATIONS

Website http://www.nol-tec.com/documents/pdfs/NT_M357A.pdf as of Oct. 31, 2016.
PCT/US18/32832 Outgoing Written Opinion of the ISA.

*Primary Examiner* — P. Macade Nichols

(57) ABSTRACT

A high-pressure valve assembly is provided. The high-pressure aerator valve assembly includes an outer housing with front and back ends terminating a central passageway; a movable valve member having a one-piece unitary metal construction slidably engaged within the central passageway in the outer housing, the valve member having an enlarged head termination sealing the front end of the passageway. The assembly also includes a spring-loaded spring guide member also having a one-piece unitary metal construction which is fixed within the central passageway in the outer housing intermediate the front and back end and a wave spring having a predetermined spring constant for supplying spring tension to keep the moveable valve member sealed. Also included are operational sensors which include a linear shaft displacement counter for counting the number of times the valve member opens and closes; a vibration sensor, or accelerometer, for measuring vibration, a temperature sensor and/or an air pressure sensor. The assembly also includes externally accessible on-board memory for storing sensing data.

20 Claims, 7 Drawing Sheets

(51) Int. Cl.
 *F16K 17/04* (2006.01)
 *F16K 37/00* (2006.01)
(52) U.S. Cl.
 CPC ........ *F16K 15/063* (2013.01); *F16K 17/0493* (2013.01); *F16K 37/005* (2013.01); *F16K 37/0041* (2013.01)
(58) Field of Classification Search
 USPC .................................................. 137/535, 541
 See application file for complete search history.

(56) References Cited

U.S. PATENT DOCUMENTS

| | | | | |
|---|---|---|---|---|
| 4,261,075 | A * | 4/1981 | Gruen | B08B 5/02 |
| | | | | 137/541 |
| 6,237,893 | B1 | 5/2001 | Rose et al. | |
| 8,539,975 | B2 * | 9/2013 | Schroeder | E21B 21/10 |
| | | | | 137/495 |
| 2012/0186659 | A1 * | 7/2012 | Lumkes | F04B 7/02 |
| | | | | 137/14 |

* cited by examiner

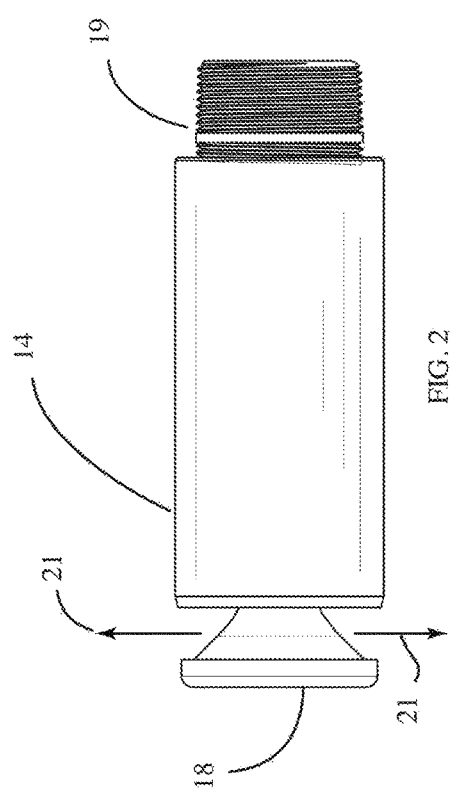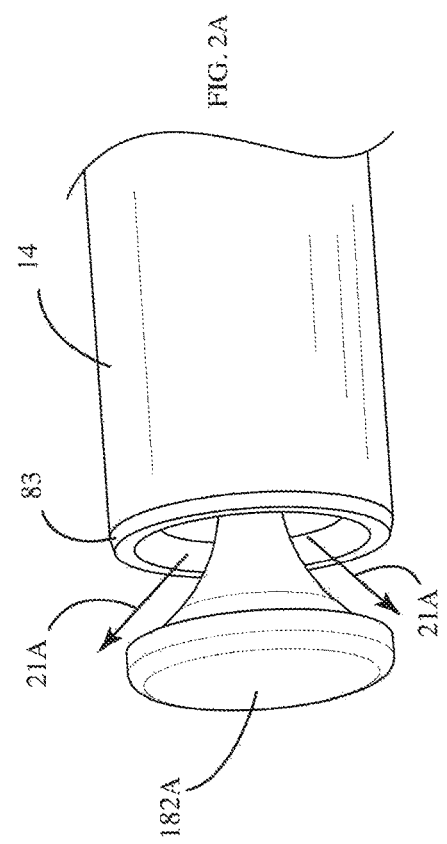

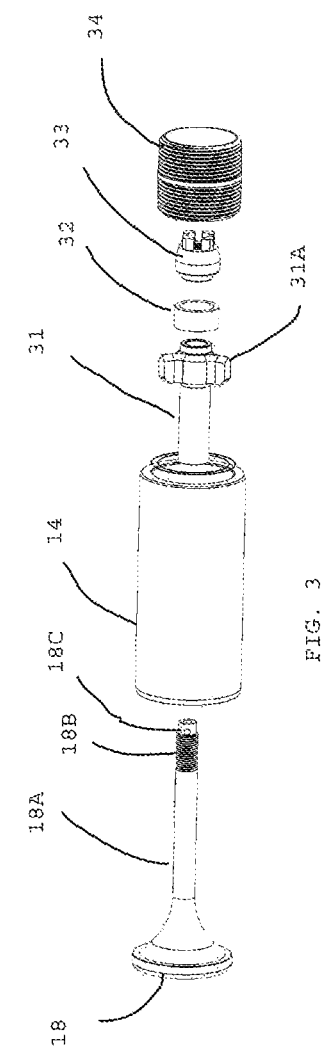

AERATOR VALVE ASSEMBLY

CROSS-REFERENCE TO RELATED APPLICATIONS

The present application is related to, claims the earliest available effective filing date(s) from (e.g., claims earliest available priority dates for other than provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

This application is a continuation-in-part of pending application Ser. No. 15/603,329, filed 23 May 2017 entitled "Sanitary High-Pressure Aerator Valve Assembly".

BACKGROUND

1. Field of Use

This invention relates generally to a valve construction for releasing a relatively large volume of pressurized gas into a storage vessel containing granular material and the like for the purpose of accelerating the flow of the granular material therefrom and more particularly to modifying such valve construction for improved operation.

2. Description of Prior Art (Background)

Discharging particulate material from an opening in a storage vessel is sometimes troublesome because of clogging, bridging, rat-holing or sticky build-up of the particulate material on the vessel walls, which can occur anywhere in the vessel but usually occurs near the discharge outlet of the vessel. This clogging is often aggravated when the particulate material is moist or contains additives that make it sticky. Numerous attempts have been made in the past to alleviate this problem. For example, it has been proposed to mount one or more gas discharge devices on the vessel walls or sloping sides of hoppers containing particulate material. Such discharge aid devices have a nozzle extending into the hopper for directing a blast of gas into the hopper to reduce clogging and bridging of the material contents so that the material can be discharged by conventional gravity or to assist other unloading equipment as disclosed in U.S. Pat. No. 3,788,527. While such prior art discharge aid devices, such as air blasters or air pulsing, have met with varying degrees of commercial success, the devices all have open discharge ends which are subjected to particulate material and fines entering into the devices via the openings and fouling the internal mechanisms and rendering the devices partially or completely inoperative. This shortcoming of the prior art devices necessitates shutdowns for costly repair, cleaning and loss of production.

Also, by the nature of construction for the prior art devices, close tolerances of the internal valve member to the surrounding outer housing are necessary for these air blasters to operate efficiently. This creates a problem where temperature changes in the surrounding environment can cause binding between parts having different thermal expansion coefficients, thereby causing eventual operational failure. These temperature variations can be seasonal or daily, caused by changing environmental conditions, or created by the industrial processes involved.

A related serious problem occurring with operation of these prior art valve constructions is that of contaminating the stored particulate material with metal pieces derived from the valve itself or its mounting plate, such as weldment bits.

An aerator valve of this type now in wide commercial use has also been developed having fewer moving parts than disclosed in the aforementioned prior art patent. Unfortunately, the modified valve construction still remains prone to much of the above noted operational difficulties attributable at least in part to having critical components fabricated with weldments. Basically, the modified valve construction includes an outer housing with front and back ends terminating a central inner passageway, a movable valve member slidably engaged within the central passageway in the outer housing, a spring loaded valve guide member affixed within the central passageway in the outer housing intermediate the front and back ends, and a pneumatic valve mechanism supplying a pressurized gas medium to drive the valve member forward unseating the front end of the passageway and releasing the pressurized gas to the surrounding atmosphere. In constructing the commercial valve device, the valve member is designed with an enlarged head termination sealing the front end of the central passageway and with the member having been formed with multiple component parts joined together by conventional welds. More particularly, a machined rod is employed which is threaded into and welded to a separate enlarged head portion of the member and with the enlarged head portion further terminating with a welded end cap. Still further welding of a metal compression spring to the spring loaded valve guide member employed in the valve construction occasions frequent device failure during valve operation accompanied by introducing weld fragments into the storage vessel where employed.

In addition, to determine if, or when, maintenance is required for an aerator valve requires rough estimations of the high count cyclic operation of the aerator valve. This approach does not take into account defective parts, abnormal operating conditions, or normal wear and tear.

To overcome the aforementioned operational difficulties with this type valve device, there is now provided an improved pneumatic powered gas discharge valve construction having few internal parts and which can still further be affixed to assorted storage vessels in an improved manner. In doing so, the present valve device can be connected to a high flow pulse type electric solenoid valve for installation on one or more storage vessel side walls to direct repeated pulses of the pressurized gas medium being released between the particulate material being stored and the inner vessel wall. Multiple installations of the presently improved valve device are contemplated with individual valves being equally spaced about the side walls of the storage vessel when desired. Affixing of the presently improved valve construction to a storage vessel side wall or multiple side walls has also been simplified for cost reduction and required maintenance or valve removal. More particularly, the prior art valve installations customarily employ a flat mounting plate coupled to another flat mounting flange in order to physically secure the valve device to the vessel side wall and with the vessel side wall often having a curved contour requiring considerable welding to accomplish such manner of joinder. As distinct therefrom, the presently improved valve construction enables joinder of the valve device to the vessel side wall with a novel weld-on mounting collar.

It is an object of the present invention, therefore, to provide an operationally improved gas-powered discharge aid device having fewer non-welded internal working parts.

It is another object of the present invention to provide the presently improved gas discharge device in a manner requiring few or no tools for assembly, calibration, or maintenance.

Another object of the present invention provides real time sensor data for immediate action or analytic analysis.

A still further object of the present invention is to provide improved means whereby the presently improved gas discharge device can be physically secured to the side walls of a storage vessel.

It is yet another object of the present invention to provide a novel cooperation between the presently improved gas discharge device and the mounting means whereby the device can be physically secured to a storage vessel side wall.

These and still further objects of the present invention will become apparent upon considering the following detailed description of the present invention.

BRIEF SUMMARY

The invention is directed towards an aerator valve assembly having an outer housing with front and back ends terminating a central passageway; a movable valve member having a one-piece unitary metal construction slidably engaged within the central passageway in the outer housing, the valve member having an enlarged head termination sealing the front end of the passageway. The assembly also includes a spring-loaded spring guide member also having a one-piece unitary metal construction which is fixed within the central passageway in the outer housing intermediate the front and back end and a wave spring having a predetermined spring constant for supplying spring tension to keep the moveable valve member sealed. Also included is a gas valve mechanism for supplying a pressurized gas medium sufficient to overcome the spring tension and to drive the valve member forward unsealing the front end of the central passageway and releasing the pressurized gas.

In accordance with another embodiment of the present invention an aerator valve assembly is provided. The valve assembly includes an outer housing with front and back ends terminating a central passageway; a movable valve member having a one-piece unitary metal construction slidably engaged within the central passageway in the outer housing, the valve member having an enlarged head termination sealing the front end of the passageway. The assembly includes a spring-loaded spring guide member also having a one-piece unitary metal construction which is fixed within the central passageway in the outer housing intermediate the front and back end and a wave spring having a predetermined spring constant for supplying spring tension to keep the moveable valve member sealed. The assembly includes a calibrated tension adjuster and the spring-loaded spring guide disposed on either end of the wave spring for compressing the wave spring. The wave spring is a 360-degree contact wave spring, wherein the 360-degree wave spring provides continuous contact between the 360-degree wave spring—calibrated tension adjuster and the 360-degree wave spring—spring loaded spring guide.

The invention is also directed towards an aerator valve assembly having at least one sensor for sensing events. Sensors include a linear shaft displacement counter for counting the number of times the valve member opens and closes; a vibration sensor, or accelerometer, for measuring vibration, a temperature sensor and/or an air pressure sensor. The assembly also includes externally accessible on-board memory for storing sensing data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 is a partially disassembled view of the sanitary high-pressure aerator showing the valve in an open position allowing pressurized gas to escape at approximately 90 degrees to the valve, in accordance with the present invention shown in FIG. 1;

FIG. 2A is a partially disassembled view of the sanitary high-pressure aerator showing the valve in an open position allowing pressurized gas to escape at approximately less than 90 degrees and substantially horizontal to the valve in accordance with the present invention shown in FIG. 1;

FIG. 3 is an exploded view of the sanitary high-pressure aerator valve assembly in accordance with the present invention shown in FIG. 2;

DETAILED DESCRIPTION

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
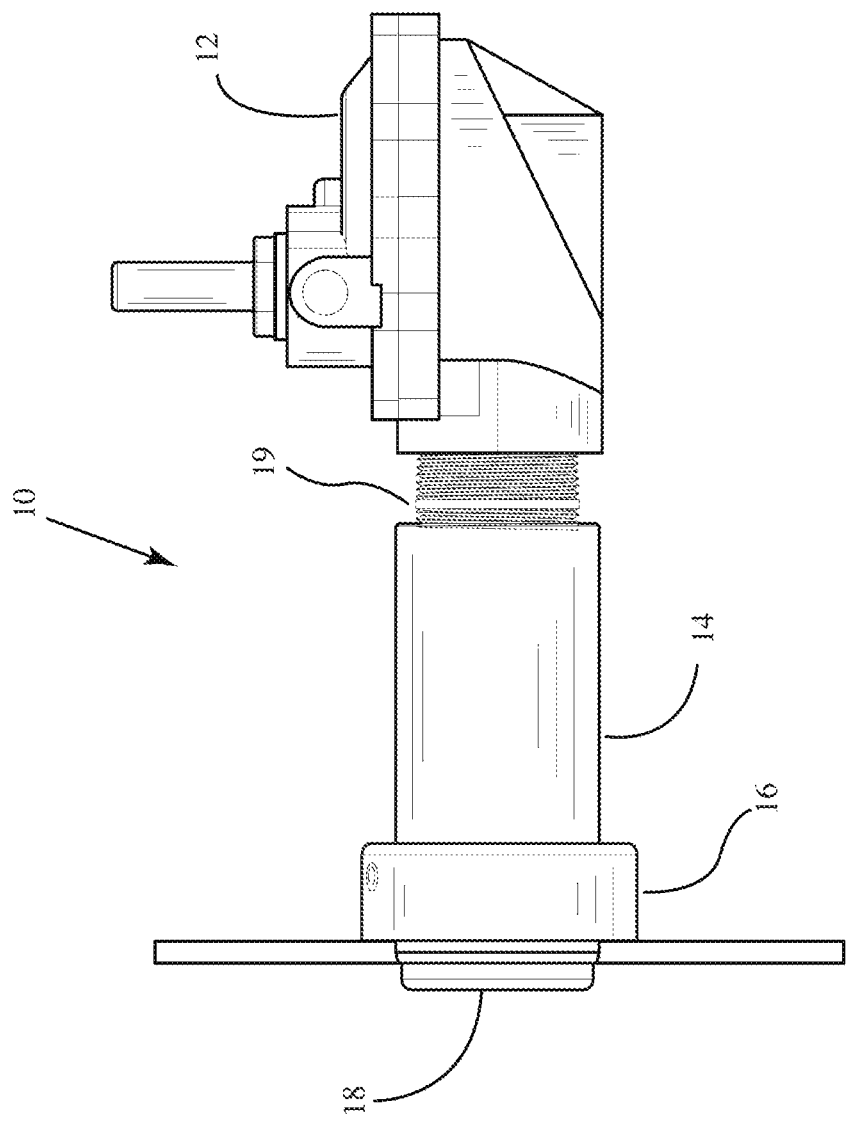
FIG. 1 is a side view of a sanitary high-pressure aerator valve assembly in accordance with the present invention.

Referring to FIG. 1 there is shown a side view of a sanitary high-pressure aerator valve assembly 10 in accordance with the present invention. The assembly 10 includes outer housing aerator body 14, one-piece unitary valve 18, threaded pipe coupler 19, and solenoid/sensor housing 12.

Referring also to FIG. 2 there is shown a partially disassembled view of the aerator 10 showing the one-piece valve 18 in an open position in accordance with the present invention shown in FIG. 2. It will be understood that pressurized air escapes through air gap 21, substantially perpendicular to one-piece valve 18, to create a circular knifing action along the sides of the containment vessel to dislodge, or prevent, lodging of particulates. It will also be appreciated that an optimum air gap ranges from 0.093 inches to 0.108 inches. As will be described herein, the invention includes physical features to obtain the optimum air gap range without having to resort to external or cumbersome calibration tools or methods.

Referring also to FIG. 2A there is shown is a partially disassembled view of the sanitary high-pressure aerator showing the valve in an open position allowing pressurized gas flow 21A to escape at approximately less than 90 degrees and substantially horizontal to the valve 182A in accordance with the present invention shown in FIG. 1.

Referring also to FIG. 3 there is shown an exploded view of the sanitary high-pressure aerator valve assembly in accordance with the present invention shown in FIG. 2. A wave spring 32 disposed against the back end of spring guide member 31 keeps the valve 18 closed until actuated by an admission of a pressurized gas to the hollow central passageway 14A. A conventional electric solenoid gas valve mechanism (FIG. 1-12) supplies a pressurized gas medium, such as air and the like, to the back end of the central passageway 14A to drive valve member 18 forward unsealing the front end of the passageway and releasing the pressurized gas to the interior of the storage vessel via air gap FIG. 2-21. For operation, the solenoid valve mechanism FIG. 1-12 can be attached to a compressed air supply line (not shown) and when pulsed normally for a ¼+L second time duration at gas pressures in the 40-100 psi range, the wave spring 32 is overcome and unitary valve member 18 with enlarged sealing head moves forward opening the discharge valve and releasing the pressurized gas in a full circle direction.

Upon pulse termination, the internal spring member 32 immediately reseats the valve member blocking, mostly, any entry of granular material from the storage vessel into the inner valve body.

It will be appreciated that the one-piece spring guide member 31 comprises three ears (see FIG. 5-31A) to reduce air flow obstruction and each ear is beveled 31B to reduce air resistance. To facilitate even force distribution around the circumference of the wave spring 32 and return of spring forces, thus reducing spring flutter, it will be appreciated that wave spring 32 includes at least one shimmed end (see FIG. 4-41A) to provide 360 degrees contact between wave spring 32 and spring guide 31, and between wave spring 32 and calibrated tension adjuster 33.

Figure 4:
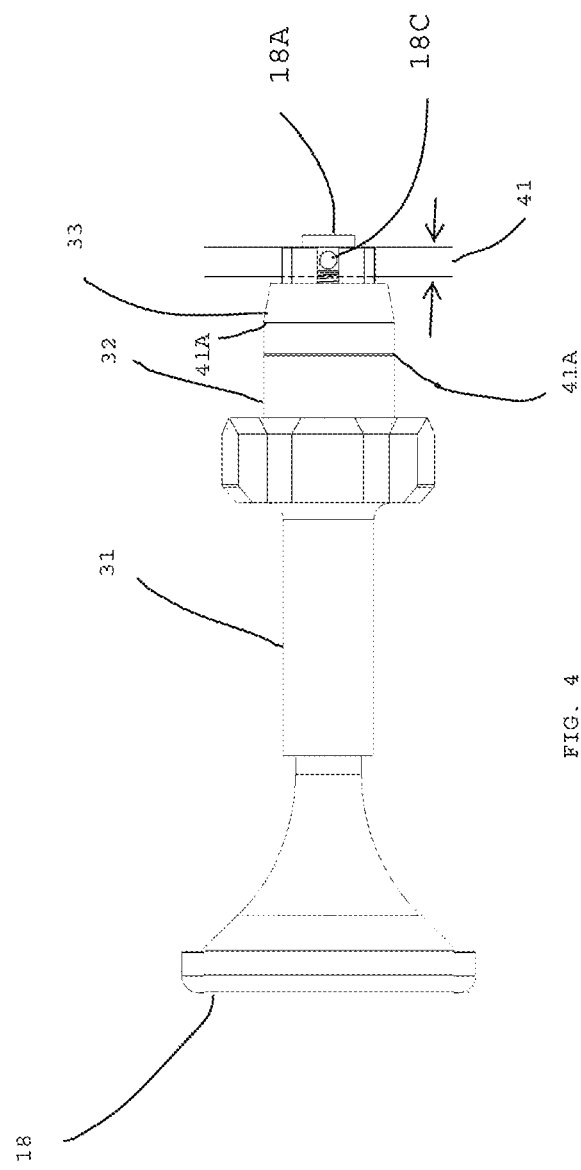
FIG. 4 is a partially disassembled view of the sanitary high-pressure aerator in accordance with the present invention shown in FIG. 2.
Figure 5:
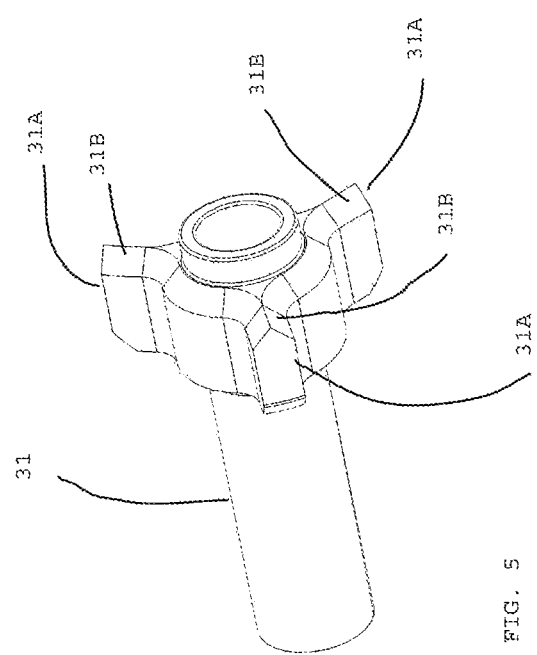
FIG. 5 is a perspective view of the three-ear spring guide in accordance with the invention shown in FIG. 2.

Still referring to FIG. 3, tension spring pin hole 18C location on metal valve 18 is predetermined for desired spring tension when calibrated tension adjuster 33 is adjusted such that tension spring hole 18C is visible (See FIG. 4). It will be further understood that the location of tension spring hole 18C is predetermined as a function of the desired spring constant associated with spring 32 and expected air pressure. For example, the hole 18C can be located on valve 18 such that the air gap air gap FIG. 2-21 is an optimal 0.093 inches to 0.108 inches for a given, or predetermined, spring constant associated with compression spring 32 and expected air pressure. Similarly, slotted tensioner 33 may be turned on calibrated valve threads 85B until the tensioner 33 bottoms out at the end of the threads 85B. The end of the threads, or thread length, 85B may be predetermined such that the distance air gap 21 is in the optimal ranged for a given spring constant and air pressure.

Figure 6:
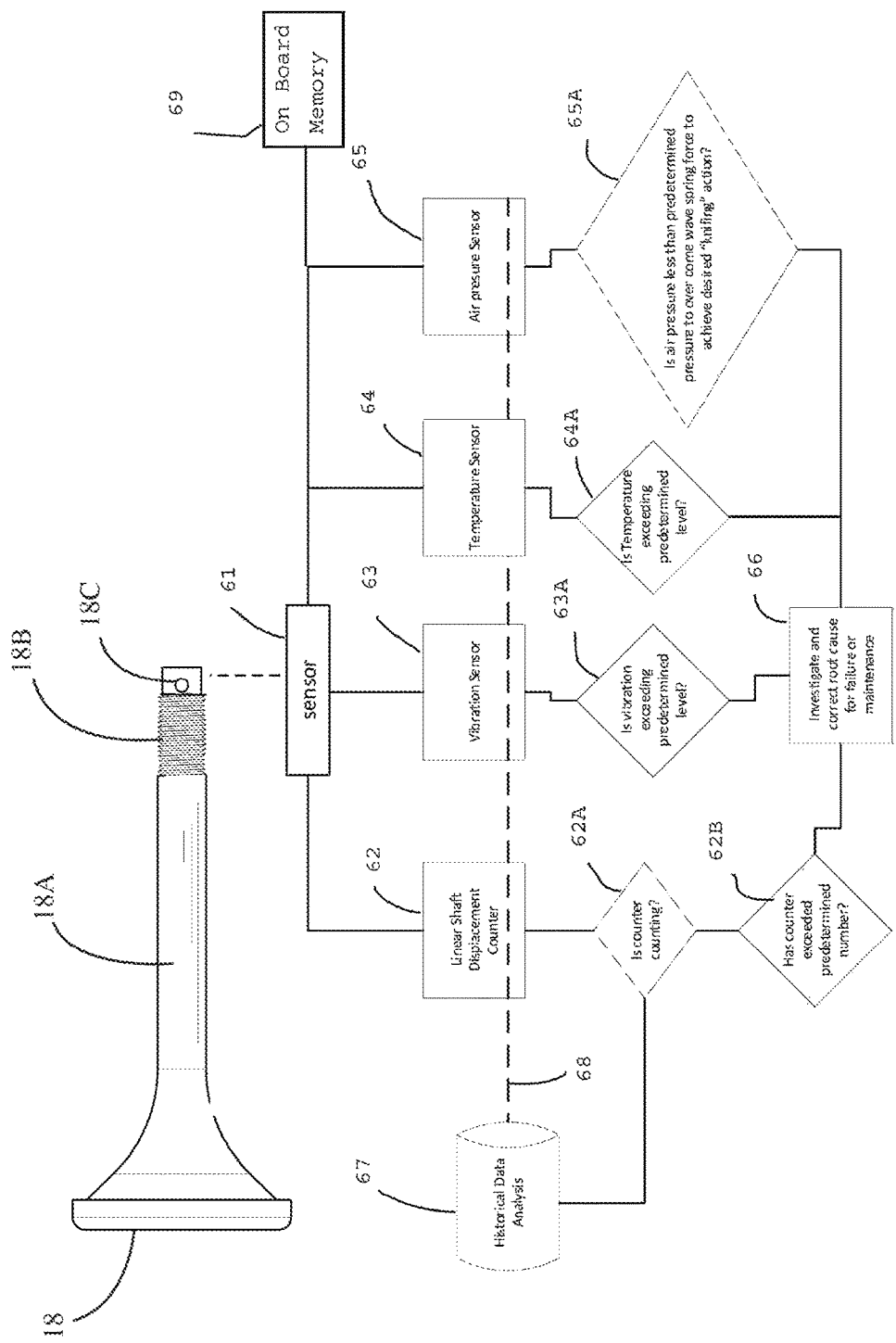
FIG. 6 is a pictorial view of the data capture and analytics system in accordance with the invention shown in FIG. 1.

Referring also to FIG. 6 there is shown a pictorial view of the data capture and analytics system in accordance with the invention shown in FIG. 1. Sensor 61 is connectable (physically or optically) to valve assembly 10. It will be understood that for clarity, sensor 61 may be any suitable sensor for sensing or detecting events or changes in the operational environment of the high-pressure valve assembly. Events may include, for example, a counting sensor 62 for counting the number of times valve 18 moves, a vibration sensor 63 for sensing excessive vibration, a temperature sensor 64 for monitoring internal and ambient temperatures, or an air pressure sensor 65 for measuring the pressure to overcome wave spring 32. It will be appreciated and understood that the aforementioned sensors may provide data to indicate a malfunction, e.g., an attachment bolt is loose, or a weld is broken, thereby causing excessive vibration, or to indicate required maintenance.

Still referring to FIG. 6 decision blocks 62A, 63A, 64A, and 65A determine abnormal conditions and set an alert condition 66 for investigation. It will be appreciated that sensors 62-65 can report sensor conditions real time or store data in an offline database 67 for comparative and trend analysis for single and/or multiple aerators 10. Data may be stored locally in externally accessible onboard memory 69 and retrieved via wireless or wired connection 68.

Figure 7:
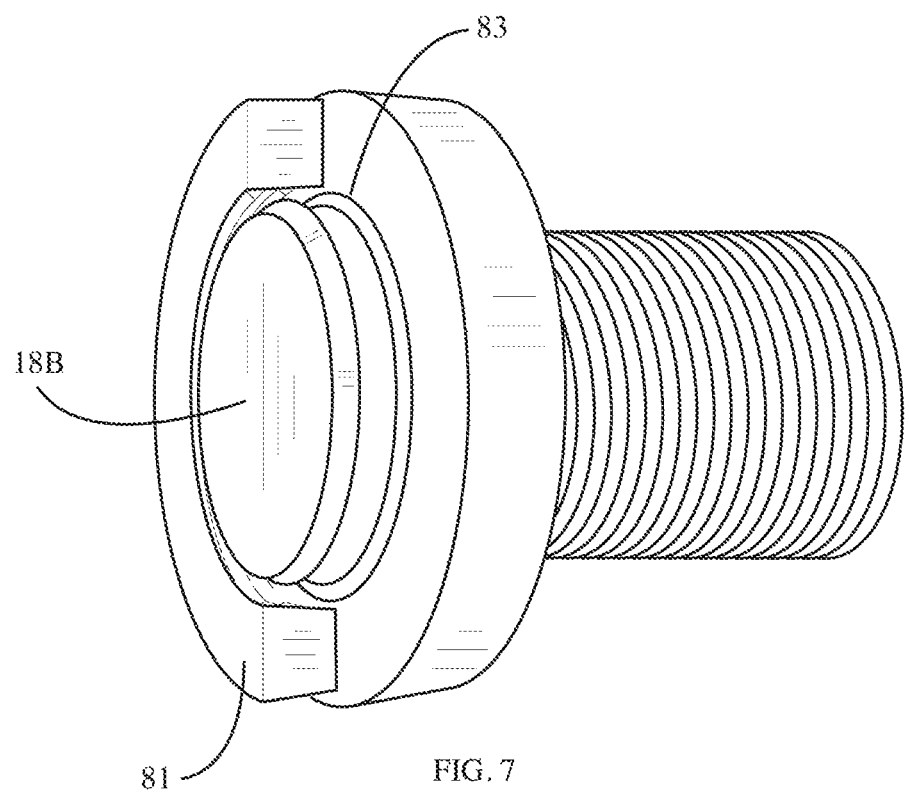
FIG. 7 is a pictorial view of an external directional adapter in accordance with the invention shown in FIG. 1.
Figure 8:
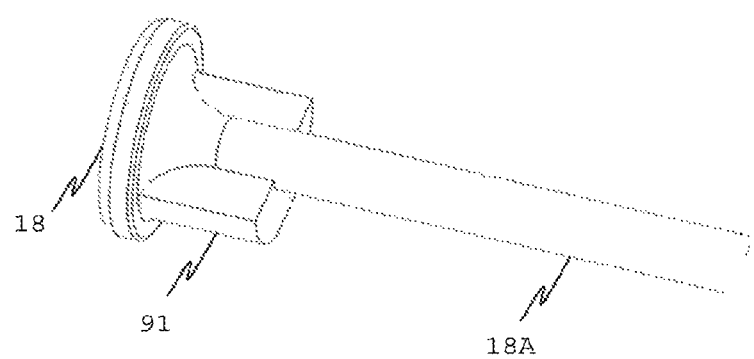
FIG. 8. is a pictorial view of an internal directional adapter in accordance with the invention shown in FIG. 1.

Referring also to FIG. 7 there is shown is a pictorial view of an external directional adapter 81 in accordance with the invention shown in FIG. 1. Referring also to FIG. 8. There is shown a pictorial view of an internal directional adapter 91 in accordance with the invention shown in FIG. 1.

Still referring to aforementioned figures. As pressurized gas (FIG. 2A-21A) drives slidable piston member 182A forward unsealing the front end of the passageway and creating a circular opening defined by circular rim 83 (FIG. 2A-83), as discussed earlier, between the enlarged piston head 18B and rim 83 (FIG. 2A-83). External directional adapter 81 directs the gas flow 21A in a predetermined path. It will be appreciated that the external directional adapter 81 prevents the release of the pressurized gas 21A through sections, or arcs, of the circular opening defined by rim 83.

Similarly, as shown in FIG. 8, pressurized gas (FIG. 2A-21A) drives slidable piston member 182A forward unsealing the front end of the passageway and creating a circular opening defined by circular rim 83 (FIG. 2A-83), as discussed earlier, between the enlarged piston head 18B and rim 83 (FIG. 2A-83). Internal directional adapter 91 directs the gas flow 21A in a predetermined path. It will be appreciated that the internal directional adapter 91 prevents the release of the pressurized gas 21A through sections, or arcs, of the circular opening defined by rim 83.

Internal directional adapter 81 may be any suitable circumference such as 90 degrees, 120 degrees, 150 degrees, or 180 degrees. It will be appreciated that the internal directional adapter 81 blocks pressurized gas 21A from exiting certain sections of the housing 14 thereby directing the escaping gas 21A through the unblocked sections, or arcs, of the circular opening defined by rim 83.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

What is claimed is:

1. An aerator valve assembly comprising:
an outer housing with front and back ends terminating a central passageway;
a movable valve member having a one-piece unitary metal construction slidably engaged within the central passageway in the outer housing, the valve member having an enlarged head termination for sealing the front end of the passageway and a calibrated threaded length end disposed at, an end opposite the enlarged head end and wherein the one-piece unitary valve member further comprises a tension spring hole, wherein a location of the tension spring hole is predetermined as a function of the spring constant, air pressure, the calibrated threaded length end of the valve member and a first predetermined air gap;
a spring-loaded spring guide member also having a one-piece unitary metal construction which is fixed within the central passageway in the outer housing intermediate the front and back end;
a wave spring having a predetermined spring constant for supplying spring tension to keep the moveable valve member sealed;
a gas valve mechanism for supplying a pressurized gas sufficient to overcome the spring tension and to drive the valve member forward unsealing the front end of the central passageway and releasing the pressurized gas
a calibrated tension adjuster; and
wherein the calibrated tension adjuster and the spring-loaded spring guide are disposed on either end of the wave spring for compressing the wave spring.

2. The aerator valve assembly as in claim 1 wherein the wave spring further comprises a 360 degree contact wave spring, wherein the 360 degree wave spring provides continuous contact between the 360 degree wave spring and the spring loaded spring guide, and between the calibrated tension adjuster and the 360 degree wave spring.

3. The calibrated tension adjuster as in claim 1 further comprises a tension adjuster calibrated as a function of the location of the tension spring hole, the spring constant, the calibrated threaded length end of the valve member and a second predetermined air gap.

4. The aerator valve assembly as in claim 1 further comprises at least one sensor for sensing events.

5. The aerator valve assembly as in claim 4 wherein the at least one sensor comprises a linear shaft displacement counter for counting the number of times the valve member opens and closes.

6. The aerator valve assembly as in claim 4 wherein the at least one sensor comprises a vibration sensor for measuring vibration.

7. The aerator valve assembly as in claim 4 wherein the at least one sensor comprises a temperature sensor.

8. The aerator valve assembly as in claim 4 wherein the at least one sensor comprises an air pressure sensor.

9. The aerator valve assembly as in claim 4 further comprising externally accessible on-board memory for storing sensing data.

10. An aerator valve assembly comprising:
an outer housing with front and back ends terminating a central passageway;
a movable valve member having a one-piece unitary metal construction slidably engaged within the central passageway in the outer housing, the valve member having an enlarged head termination sealing the front end of the passageway;
a spring-loaded spring guide member also having a one-piece unitary metal construction which is fixed within the central passageway in the outer housing intermediate the front and back end;
a wave spring having a predetermined spring constant for supplying spring tension to keep the moveable valve member sealed wherein the wave spring further comprises a 360-degree contact wave spring, wherein the 360-degree wave spring provides continuous contact between the 360-degree wave spring and the spring loaded spring guide, and between the calibrated tension adjuster and the 360-degree wave spring;
a gas valve mechanism for supplying a pressurized gas medium sufficient to overcome the spring tension and to drive the valve member forward unsealing the front end of the central passageway and releasing the pressurized gas;
a calibrated tension adjuster; and
wherein the calibrated tension adjuster and the spring-loaded spring guide are disposed on either end of the wave spring for compressing the wave spring.

11. The aerator valve assembly as in claim 10 further comprising:
the movable valve member having a one-piece unitary metal construction slidable for a predetermined distance within a portion of the central passageway and wherein the movable valve member having a one-piece unitary metal construction comprises:
the enlarged head disposed at one end of the one-piece unitary valve member for sealing one end of the central passageway;
a calibrated threaded length end disposed at an end opposite the enlarged head end;
a tension spring hole, wherein a location of the tension spring hole is predetermined as a function of the spring constant, air pressure, the calibrated threaded length end of the valve member and a first predetermined air gap.

12. The calibrated tension adjuster as in claim 11 further comprises a tension adjuster calibrated as a function of the location of the tension spring hole, the spring constant, the calibrated threaded length end of the valve member and the first predetermined air gap.

13. The aerator valve assembly as in claim 10 further comprises at least one sensor for sensing events associated with the high-pressure aerator valve assembly.

14. An aerator valve assembly comprising:
an outer housing with a front end and a back end terminating a central passageway;
a movable valve member having a one-piece unitary metal construction slidably engaged within the central passageway in the outer housing, the valve member having an enlarged head termination for sealing the front end of the passageway;
a calibrated threaded length end disposed at an end opposite the enlarged head end;
a spring-loaded spring guide member also having a one-piece unitary metal construction which is fixed within the central passageway in the outer housing intermediate the front and back end of the central passageway;
a wave spring having a predetermined spring constant for supplying spring tension for keeping the moveable valve member sealed in the absence of pressurized, gas;
a gas valve mechanism for supplying the pressurized gas sufficient to overcome the spring tension and to drive the moveable valve member forward unsealing the front end of the central passageway and releasing the pressurized gas;

a calibrated tension adjuster;

wherein the calibrated tension adjuster and the spring-loaded spring guide are disposed on either end of the wave spring for compressing the wave spring; and wherein the wave spring further comprises:
- a 360-degree contact wave spring, wherein the 360-degree wave spring provides continuous contact between the 360-degree wave spring—calibrated tension adjuster and the 360-degree wave spring—spring loaded spring guide;
- a tension spring hole, wherein a location of the tension spring tension hole is predetermined as a function of the spring constant, air pressure, the calibrated threaded length end of the valve member and a first predetermined air gap associated with the predetermined distance; and the calibrated tension adjuster calibrated as a function of the location of the tension spring hole, the spring constant, the calibrated threaded length end of the valve member and the first predetermined air gap.

15. The aerator valve assembly as in claim 14 further comprises at least one sensor for sensing events associated with the high-pressure aerator valve assembly, wherein the at least one sensor comprises a linear shaft displacement counter for counting the number of times the valve member opens and closes.

16. The aerator valve assembly as in claim 14 wherein the moveable valve member comprises a first valve member for releasing the pressurized gas at approximately perpendicular to the moveable valve member.

17. The aerator valve assembly as in claim 14 wherein the moveable valve member comprises a second valve member for releasing the pressurized gas at approximately horizontal to the moveable valve member.

18. The aerator valve assembly as in claim 14 further comprising a passive directional air flow device.

19. The aerator valve assembly as in claim 18 wherein the passive directional air flow device comprises an internal directional air flow device.

20. The aerator valve assembly as, in claim 18 wherein the passive directional air flow device comprises an external air flow device.

* * * * *